United States Patent
Cronk et al.

(10) Patent No.: US 6,829,767 B2
(45) Date of Patent: Dec. 7, 2004

(54) METHOD TO CONTROL ALTERNATIVE APPLICATION OPERATION BASED ON RESULTS OF AN ORDERED APPLICATION EXECUTION ATTEMPT

(75) Inventors: Matthew Slade Cronk, Austin, TX (US); Gerald Francis McBrearty, Austin, TX (US); Johnny Meng-Han Shieh, Austin, TX (US); Michael William Wortman, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 09/810,057

(22) Filed: Mar. 15, 2001

(65) Prior Publication Data
US 2002/0133526 A1 Sep. 19, 2002

(51) Int. Cl.$^7$ .................................................. G06F 9/46
(52) U.S. Cl. ............................. 718/108; 707/1; 707/10; 714/49
(58) Field of Search ................................. 718/100, 107, 718/108; 707/1–10; 714/48, 49

(56) References Cited

U.S. PATENT DOCUMENTS

| | | | | |
|---|---|---|---|---|
| 4,481,577 A | * | 11/1984 | Forson | 707/1 |
| 5,014,192 A | * | 5/1991 | Mansfield et al. | 707/1 |
| 5,307,354 A | * | 4/1994 | Cramer et al. | 714/4 |
| 5,412,772 A | * | 5/1995 | Monson | 345/746 |
| 5,758,062 A | * | 5/1998 | McMahon et al. | 714/38 |
| 5,905,868 A | * | 5/1999 | Baghai et al. | 709/224 |
| 5,966,715 A | * | 10/1999 | Sweeney et al. | 707/203 |
| 6,003,063 A | * | 12/1999 | Wiley | 718/108 |
| 6,418,554 B1 | * | 7/2002 | Delo et al. | 717/174 |
| 6,523,166 B1 | * | 2/2003 | Mishra et al. | 717/174 |
| 6,654,954 B1 | * | 11/2003 | Hicks | 717/162 |
| 6,658,659 B2 | * | 12/2003 | Hiller et al. | 717/170 |
| 6,662,186 B1 | * | 12/2003 | Esquibel et al. | 707/101 |

* cited by examiner

Primary Examiner—Lewis A Bullock, Jr.
(74) Attorney, Agent, or Firm—Duke W. Yee; Volel Emile; Cathrine K. Kinslow

(57) ABSTRACT

A method, system and computer readable instructions for executing a file with a file format is provided. An attempt is made to execute the file with a first computer application within a plurality of computer applications. Responsive to the first computer application being unable to recognize the file format of the file, a second computer application within the plurality of computer applications is selected to execute the file. The file is then executed using the selected second computer application.

20 Claims, 5 Drawing Sheets

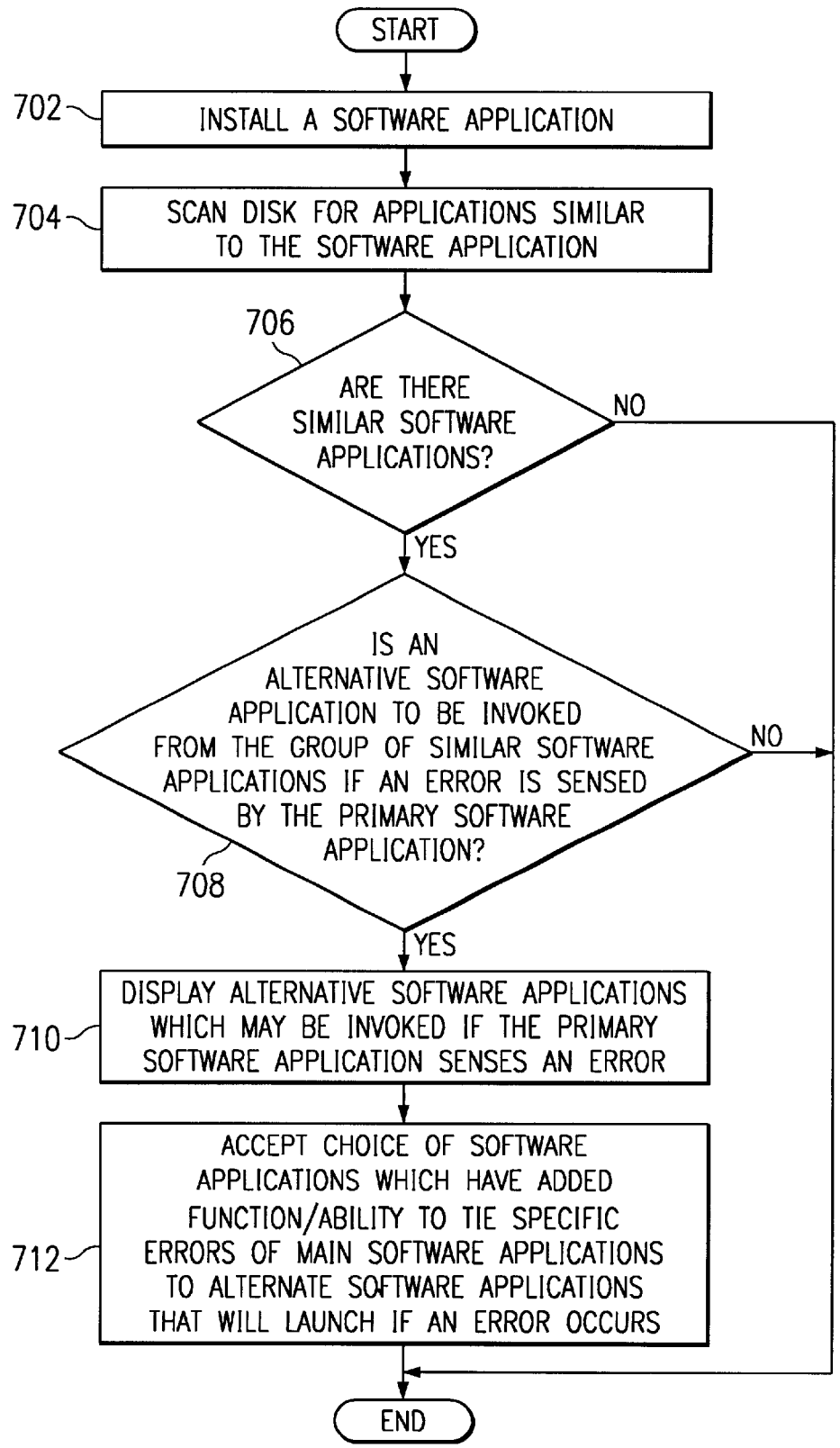

METHOD TO CONTROL ALTERNATIVE APPLICATION OPERATION BASED ON RESULTS OF AN ORDERED APPLICATION EXECUTION ATTEMPT

BACKGROUND OF THE INVENTION

1. Technical Field

The present invention relates generally to an improved data processing system. More particularly, the present invention relates to an improved method for controlling application operation within the data processing system. Still more particularly, the present invention relates to an improved method for controlling application operation based on results from a previous application execution attempt.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

During the installation of new computer applications and programs, installation programs are typically used to copy a set of files from a source media to a target. The installation program will create a series of directories in a tree starting at a specified location in the file system of the target. In certain cases, some applications allow a user some choice during the installation process. For example, an application may allow a user to choose a specific edition of the application, for example, a standard edition or an advanced edition. After a user has installed one of the offered editions, both the graphical user interface and the functions provided by the particular installed edition are supported. Regardless of whether the user needs a specific function provided by the chosen and installed edition, the function is enabled, stored on the computer system's storage device and appears on the applicable graphical user interface.

In addition, a computer application may fail in its attempt to open a file. For example, a "jpeg" image may be downloaded of the Internet, however, the file that is downloaded uses a slightly non-standard program to create the jpeg image. Therefore, when a user attempts to open the downloaded jpeg image and convert it into a gif image, the conversion program being employed by the user fails with an error when trying to decode the jpeg image. After receiving an error message indicating that the conversion program does not recognize the downloaded jpeg image, the user may manually close the conversion program down and open an alternate program which may recognize the non-standard jpeg image. If the alternate program does recognize the non-standard jpeg image, then it may be saved as a modified jpeg file and the first program may then be manually opened to open the modified jpeg file.

Furthermore, a computer application stored on a user's computer may not be able to open a file because of, for example, the file's size or complexity. For example, a typical operating system will attempt to use the lowest common application that can read text. The operating system will attempt to read the file with the common application. However, the file may be too large or too complicated for the common application and opening up of the file fails with an error message alerting the user of the failure. When this error condition is created, the user must manually attempt to open the file again with a more sophisticated program capable of handling the large or complicated file. Thus, the user is confined to attempting to open the file with a default application as defined by the operating system, the opening of the file causing an error because of the limitations of the default application and then the user specifying and reattempting to open the file using another application.

Thus, the creation of an error condition and the manual employment of alternate applications by the user is inefficient and frustrating. Therefore, it would be advantageous to have an improved method for controlling alternative application operation based on results of an ordered application execution attempt.

SUMMARY OF THE INVENTION

A method, system and computer readable instructions is provided for executing a file with a file format. An attempt is made to execute the file with a first computer application within a plurality of computer applications. Responsive to the first computer application being unable to recognize the file format of the file, a second computer application within the plurality of computer applications is selected to execute the file. The file is then executed using the selected second computer application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an exemplary flowchart illustrating configuring a system for accessing an alternative application based on results of a primary application execution attempt in accordance with a preferred embodiment of the present invention.

DETAILED DESCRIPTION OF THE PREFERRED EMBODIMENT

Figure 1:
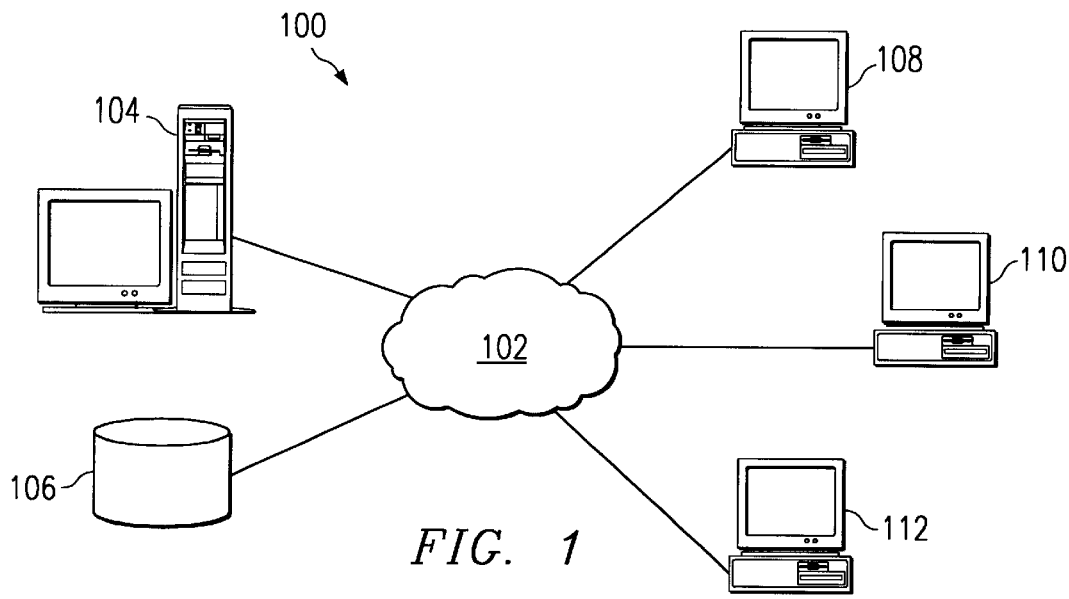
FIG. 1 is a pictorial representation of a networked data processing system in which the present invention may be implemented.

With reference now to the figures, and in particular with reference to FIG. 1 which is a pictorial representation of a networked data processing system in which the present invention may be implemented.

Networked data processing system 100 is a network of computers in which the present invention may be implemented. Networked data processing system 100 contains a network 102, which is the medium used to provide communications links between various devices and computers connected together within networked data processing system 100. Network 102 may include wireline connections, such as copper wire or fiber optic cables, and wireless connections, such as cellular telephone connections. Also, the connections for network 102 may be either permanent, such as with a dedicated line, and/or temporary, such as connections made through dial up telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In a multi-tier networked environment, networked applications are provided in which a portion of the application is located on a server, such as server 104 and another portion of the application is located on a client, such as client 108. In this implementation, the client is considered a first tier system while the server is considered a second tier system.

Networked data processing system 100 may include additional servers, clients, and other devices not shown. In the depicted example, networked data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, networked data processing system 100 also may be implemented as an number of different types of networks, such as, for example, an intranet or a local area network.

FIG. 1 is intended as an example, and not as an architectural limitation for the processes of the present invention. For example, network 102 may use other hardware devices, such as, plotters, optical scanners, and the like in addition or in place of the hardware depicted in FIG. 1.

Figure 2:
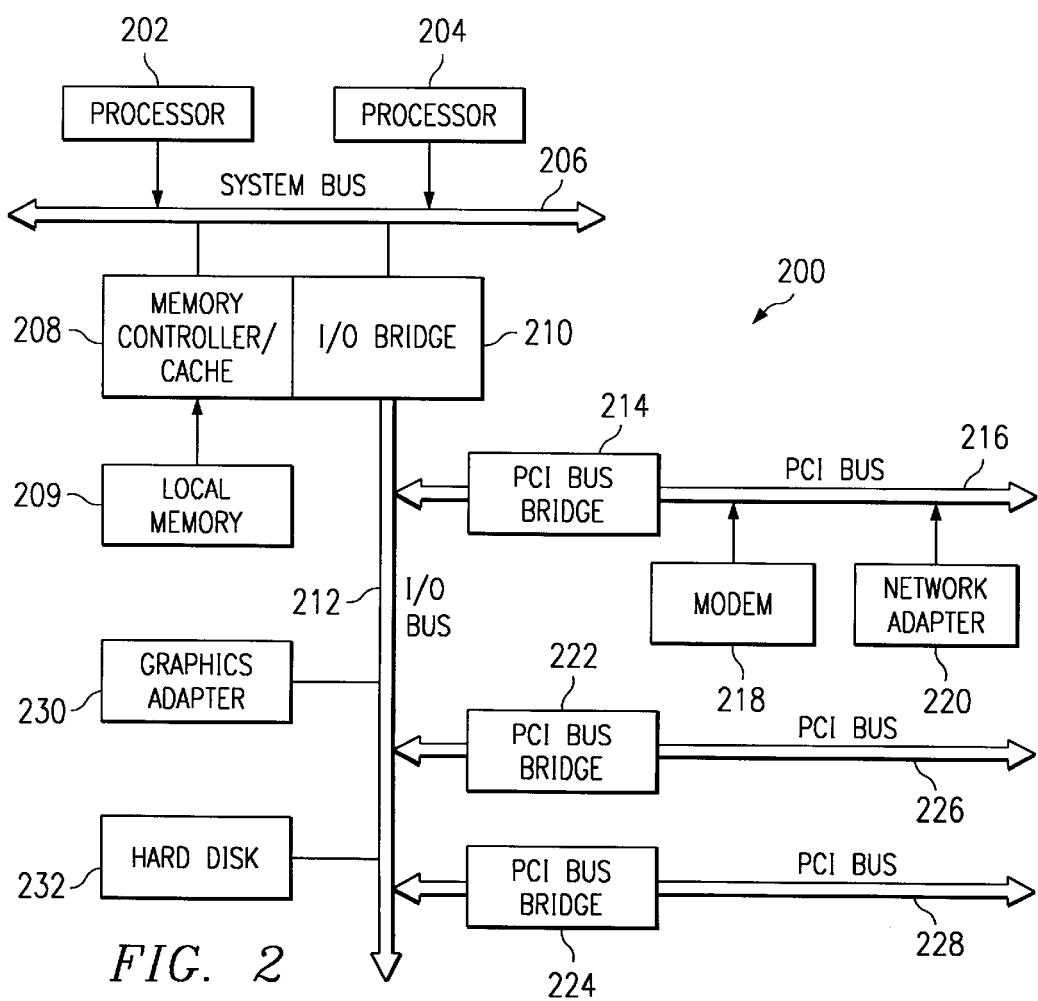
FIG. 2 is a block diagram of a data processing system which may be implemented as a server, in accordance with a preferred embodiment of the present invention.

FIG. 2 is a block diagram of a data processing system which may be implemented as a server, in accordance with a preferred embodiment of the present invention. FIG. 2 is an example of a server, such as, for example, server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218 and 220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figures 3, 5A, 5B:
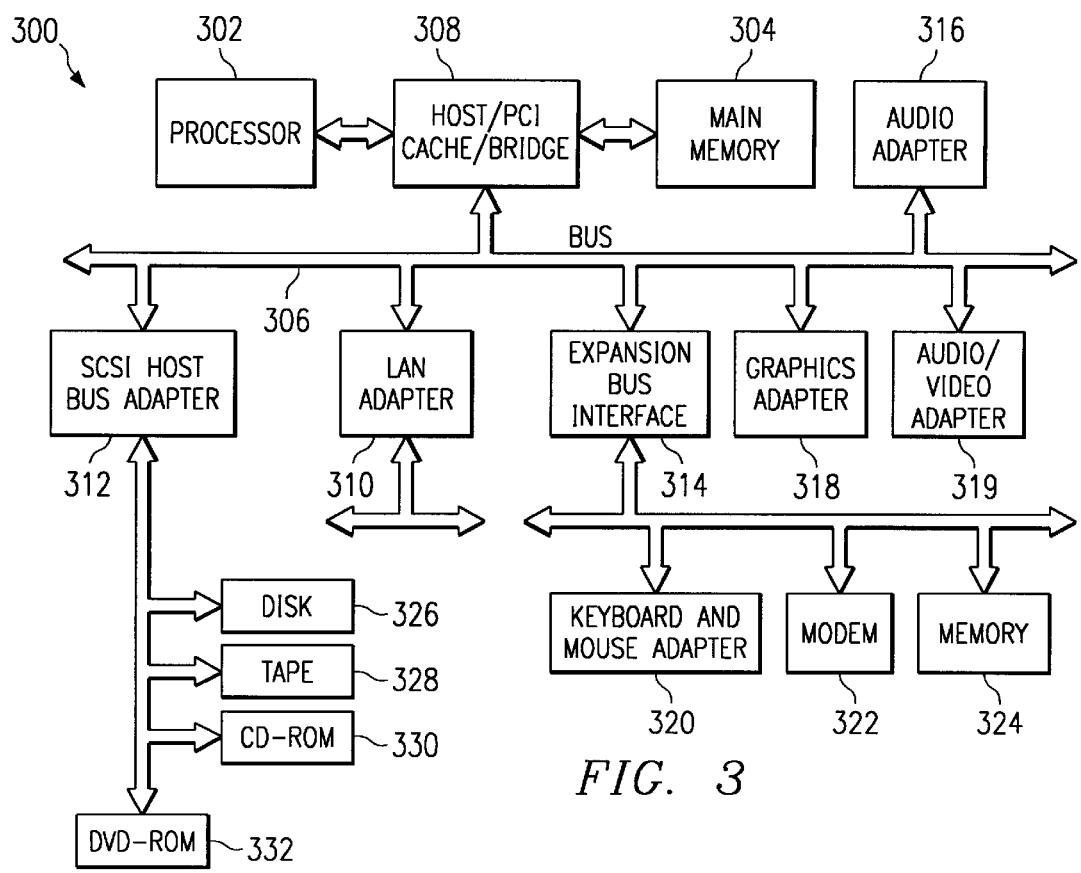
FIG. 3 is a block diagram of a data processing system in which the present invention may be implemented.

FIG. 3 is a block diagram of a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, CD-ROM drive 330, and digital video disc read only memory drive (DVD-ROM) 332 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as Windows 2000, which is available from Microsoft Corporation. Windows 2000 is a trademark of from Microsoft Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to a multiprocessor data processing system.

The present invention provides a method for making interoperability between files of different programs easier to read and/or execute between different operating systems. The present invention allows a user programmed response to files which have failed to be opened because of incompatibility between the file and the computer application employed to open the file without user intervention when such an occurrence happens. The present invention may instruct an operating system to assume that all files with a specific extension is a specific type of file. The operating system may then instruct a primary computer application to open all files with the specific extension. If the primary computer application fails to recognize or be able to open the file, the primary computer application ceases its attempt to open the file and a secondary computer application automatically attempts to open the file without any input from the user.

Figure 4:
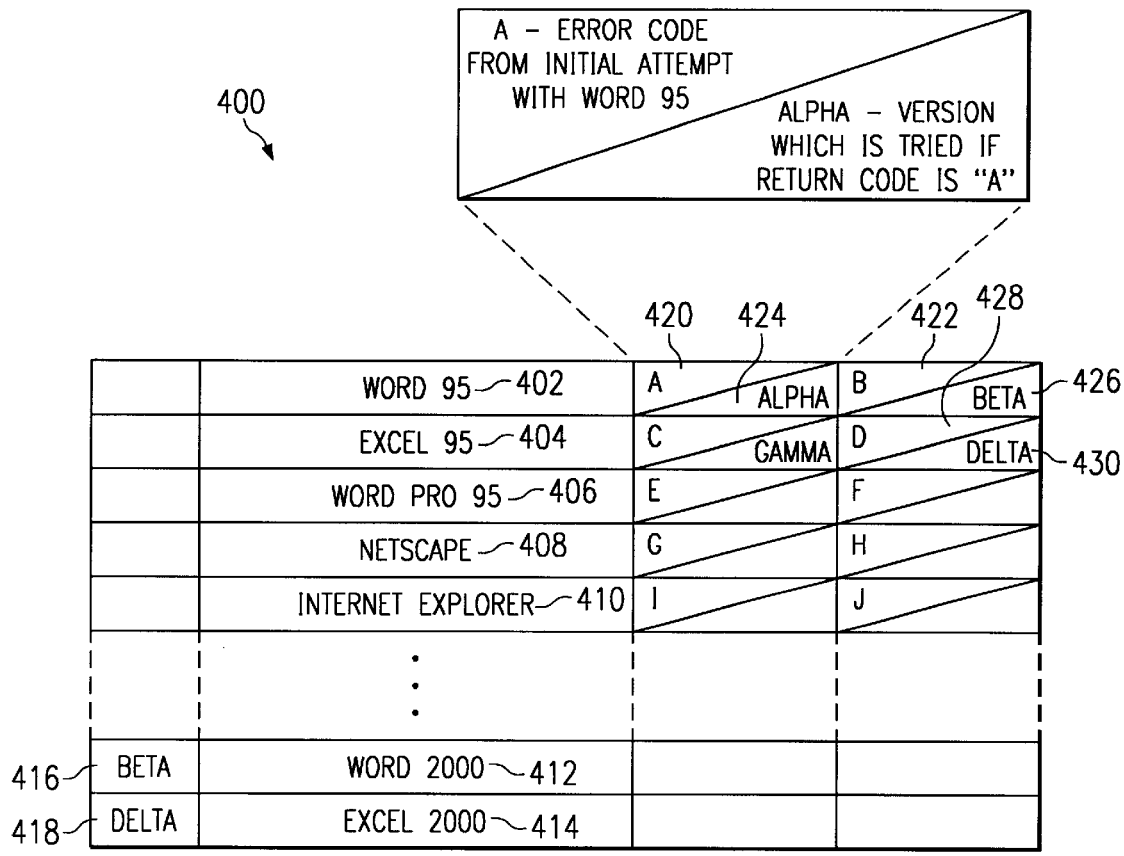
FIG. 4 is an exemplary resolution table in accordance with a preferred embodiment of the present invention.

FIG. 4 is an exemplary resolution table in accordance with a preferred embodiment of the present invention. Resolution table 400 provides a mechanism for which after failure of an initial application to access a file, an alternate application is found and this alternate application attempts to open the file. In this example, resolution table 400 consists of several computer applications, such as, for example, Word 95 402, Excel 95 404, Word Pro 95 406, Netscape 408, Internet Explorer 410, Word 2000 412 and Excel 2000 414. These computer applications may be stored on a data processing system storage device and may be accessible by the data processing system operating system. Associated with each computer application, for example, Word 95 402, is an error code entry and an index code, for example, error code entry "A" 420 and index code "alpha" 424, which indicates if there is an error associated with the opening or execution of a primary computer application, an alternate path may be provided in an attempt to open or execute a secondary computer application. In this example, error code "A" 420 is received and, in one embodiment, the present invention may search for and locate "alpha" index error code 424 in table 400. Upon locating "alpha" index error code 424 in table 400, an attempt may be made to execute opening the alternate file upon a failing of a file associated with, for example, "Word 95" 402. Similar to error code "A" 420 and "alpha" index error code 424, also associated with "Word 95" 402, is error code entry "B" 422 and index code "beta" 426, which indicates if there is an error associated with the opening or execution of primary computer application "Word 95" 402, an alternate path may be provided in an attempt to open or execute a secondary computer application. Upon locating "beta" index error code 426 in table 400, an attempt may be made to execute the same function upon a failing of a file associated with, for example, "Word 2000" 412. Likewise, if "Excel 95" 404 should fail to open or execute, error code "D" 428 may search for and locate "delta" index code 430. Upon locating "delta" index error code 430 in table 400, an attempt may be made to execute the same function upon a failing of a file associated with, for example, "Excel 2000" 418.

Figure 5C:
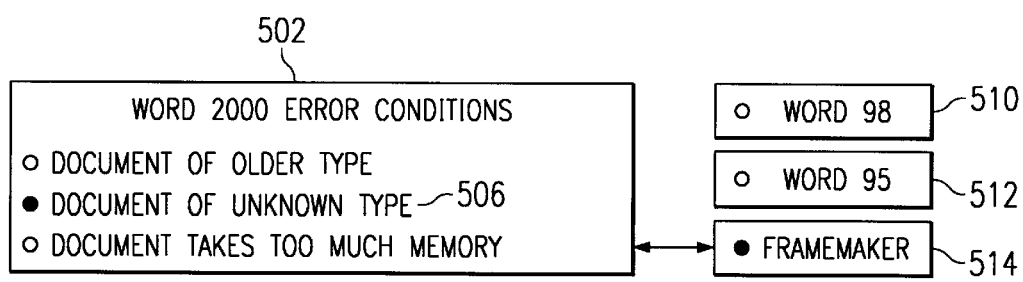
FIG. 5 is a block diagram illustrating the process of accessing an alternative application based on results of a primary application execution attempt in accordance with a preferred embodiment of the present invention.

FIGS. 5A–5C are block diagrams illustrating the process of accessing an alternative application based on results of a primary application execution attempt in accordance with a preferred embodiment of the present invention. In FIG. 5A, Word 2000 error condition display 502 may contain a variety of error conditions in which, after attempting to execute a primary application, an alternate application may be chosen. For example, Word 2000 error condition display includes error conditions such as a file containing a document is of an older type 504, the file containing the document is of an unknown type 506 and the file containing the document takes up too much storage memory 508. If any of these error conditions exist, a primary computer application, for example Word 2000, may not be executed and then an alternate computer application may be invoked. In this example, Word 98 510, Word 95 512 and Framemaker 514 may be used an alternate applications if the primary application, Word 2000, is not able to open a file.

FIG. 5B illustrates an error condition displayed in Word 2000 error condition display 502 in which document of older type 504 is detected. In such a case, any number of alternate applications may be chosen to replace the primary application Word 2000. In this example, when document of older type 504 is detected, Word 98 510 may be invoked to execute the file.

FIG. 5C illustrates an error condition displayed in Word 2000 error condition display 502 in which document of unknown type 506 is detected. In such a case, as before, any number of alternate applications may be chosen to replace the primary application Word 2000. In this example, when document of unknown type 506 is detected, Framework 514 may be invoked to execute the file.

Figure 6:
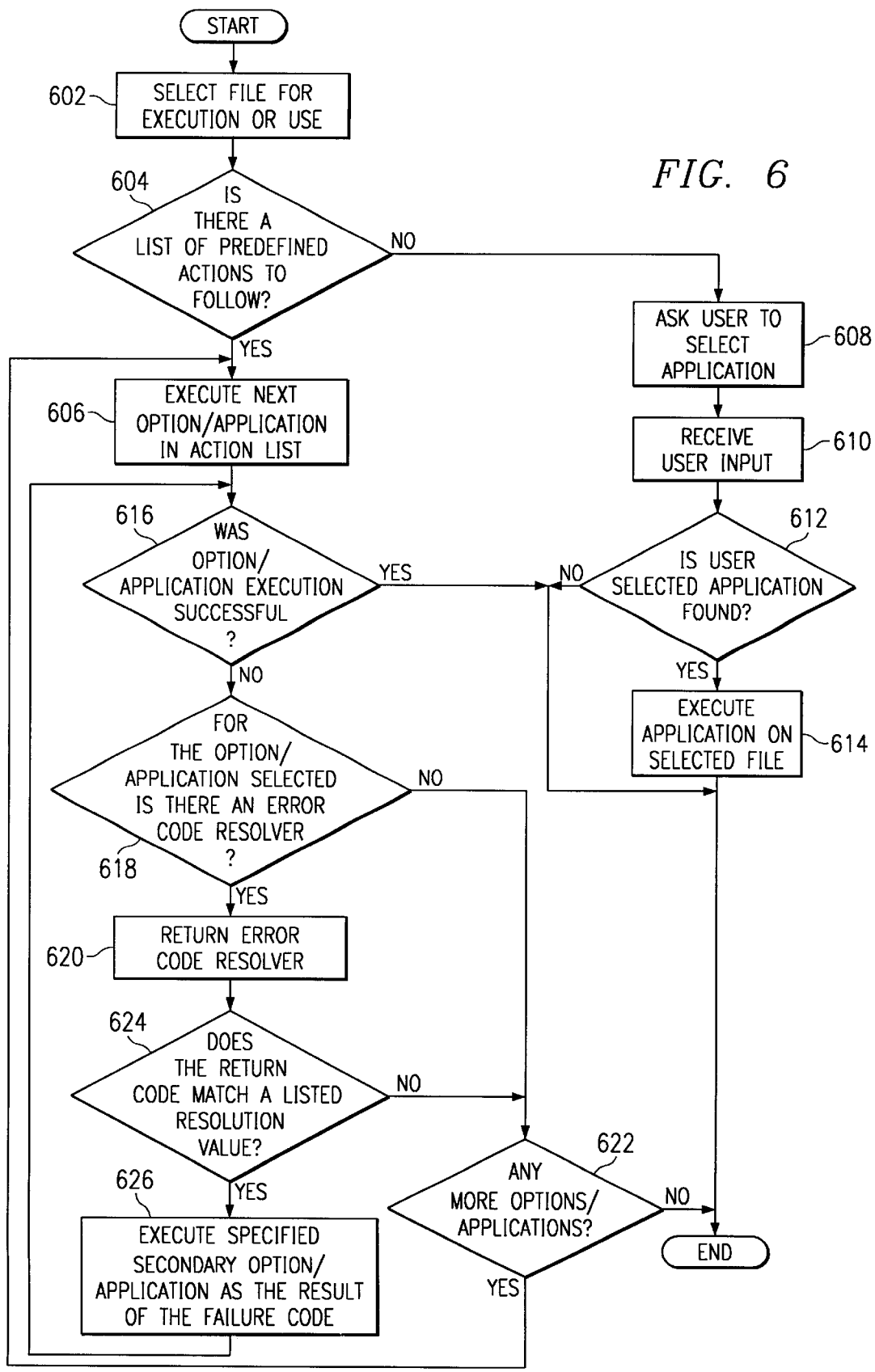
FIG. 6 is an exemplary flowchart illustrating controlling alternative application operation based on results of an application execution attempt in accordance with a preferred embodiment of the present invention.

FIG. 6 is an exemplary flowchart illustrating controlling alternative application operation based on results of an application execution attempt in accordance with a preferred embodiment of the present invention. FIG. 6 is a further illustration of the operation of resolution table method in FIG. 4. In this example, the operation begins with selecting a file for execution or use (step 602). Then a determination is made as to whether or not there is a list of predefined actions to follow (step 604). If there is a list of predefined actions to follow (step 604:YES), the next option or application in the action list is executed (step 606). A determination is then made as to whether or not the option or application execution was successful (step 616). If the option or application execution was successful (step 616:YES), the operation terminates. If the option or application execution was not successful (step 616:NO), then a determination is made as to whether or not there is an error code resolver for the option or application selected (step 618).

If there is an error code resolver for the option or application selected (step 618:YES), the error code resolver is returned (step 620). Error_resolver( ) may be a function that an operating system communicates with. For example, an operating system may call an application, such as, for example, Word 95, to open and read a file. If the operating system cannot open and read the file, a failure return code may be returned. Then the operating system calls the error_resolver( ) function and may transmit one or more values to the error_resolver( ) function. For example, the operating system may transmit values "Word 95" and "A". Then the error_resolver( ) function searches a table, such as resolution table 400 in FIG. 4 and determines first if "Word 95" has an entry to handle failure cases. This is the error code resolver. The error_resolver( ) function may then return with a lookup value of "alpha". As a result, the operating system may look in resolution table 400 in FIG. 4 and determine that, for example, "Word 98" is the next command to be used on the file that is not able to be read.

Then a determination is then made as to whether or not the returned error code matches a listed resolution value (step 624). If the returned error code does match a listed resolution value (step 624:YES), then a specified secondary option or application is executed as a result of the failure code (step 626) and the operation returns to step 616 in which a determination is made as to whether or not the option or application execution is successful. If the return code does not match a listed resolution value (step 624:NO), a determination is made as to whether or not there are any more options or applications to be processed (step 622). If there are more options or applications to be processed (step 622:YES), the operation returns to step 606 in which the next option or application in the action list is executed. If there are no more options or applications to be processed (step 622:NO), the operation terminates.

Returning to step 604, if there is not a list of predefined actions to follow (step 604:NO), the user is asked to pick an application to execute (step 608). The user selected application for execution is received (step 610). Then a determination is made as to whether or not the user selected application is found (step 612). If the user selected application is not found (step 612:NO), the operation terminates. If the user selected application is found (step 612:YES), the user selected application is executed on the selected file (step 614) and thereafter the operation terminates.

FIG. 7 is an exemplary flowchart illustrating configuring a system for accessing an alternative application based on results of a primary application execution attempt in accordance with a preferred embodiment of the present invention. In this example, the operation begins by starting the installation of a software application (step 702). Then a storage disk is scanned for applications similar to the software application being installed (step 704). A determination is then made as to whether or not there are any similar software applications to the software application being installed (step 706). If there are no software applications similar to the software application being installed (step 706:NO), then the operation terminates.

If there are software applications similar to the software application being installed (step 706:YES), then a determination is made as to whether or not an alternative software application is to be invoked from the group of similar software applications if an error is sensed by the primary computer application (step 708). If an alternate software program is not to be invoked from the group of similar software applications if an error is senses by the primary computer application (step 708:NO), then the operation terminates. If an alternate software program is to be invoked from the group of similar software applications if an error is senses by the primary computer applications (step 708:YES), then a the alternative software applications is displayed which may be invoked if the primary software applications senses an error (step 710). Choices from the display of software applications is accepted in which the chosen software applications may have added function/ability to tie specific errors of primary software applications to alternate software applications that will launch if an error sensed by the primary software application occurs (step 712) and thereafter the operation terminates.

Therefore, the present invention provides for an improved method controlling alternative application operation based on results of an ordered application execution attempt. If a computer application attempts to open or execute a file and such attempt is unsuccessful because the computer application does not recognize the file, the present invention provides that the computer application automatically ceases its attempt to open or execute file. In such a situation, an alternate secondary computer application is automatically employed to attempt to open or execute the file. If the alternate secondary computer application is unable to open or execute the file, the alternate secondary computer application automatically ceases its attempt to open or execute the file and a third computer application is automatically employed to open or execute the file. This process continues until either the file is recognized by a computer application and opened or executed or the computer applications available to the operating system are exhausted.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, having a plurality of computer applications, for executing a file with a file format, the method comprising the steps of:
   attempting to execute the file with a first computer application within the plurality of computer applications;
   responsive to the first computer applications being unable to recognize the file format of the file, selecting a second computer application within the plurality of computer applications to execute the file by performing the steps of:
      associating an error code with the first computer application;
      associating an index code with the error code; and
      selecting the second computer application within the plurality of computer applications based on the index code; and
   executing the file using the selected second computer application.

2. The method of claim 1, wherein the secondary computer application is an alternate version of the first computer application.

3. The method of claim 1, wherein the error code is a predetermined value.

4. The method of claim 1, wherein selecting a second computer application from the plurality of computer applications to execute the file, further includes:
   displaying a selectable presentation of at least one of the computer applications in the plurality of computer applications;
   receiving an indication of a selection, from the data processing system, of at least one of the computer applications in the plurality of computer applications; and
   executing the file based on the selection.

5. The method of claim 4, wherein the selection is made from a remote terminal.

6. The method of claim 4, wherein the selection is made from a client.

7. A data processing system, the system comprising:
   a processor; and
   a memory coupled to the processor, wherein the memory includes a plurality of computer applications,
   wherein the processor attempts to execute the file with a first computer application within the plurality of computer applications, responsive to the first computer application being unable to recognize the file format, the processor selects a second computer application within the plurality of computer applications from the memory to execute the file by performing the steps of:
      associating an error code with the first computer application;
      associating an index code with the error code; and
      selecting the second computer application within the plurality of computer applications based on the index code; and
   the processor executes the file using the selected second computer application.

8. The data processing system of claim 7, wherein the secondary computer application is an alternate version of the first computer application.

9. A data processing system, having a plurality of computer applications, for executing a file with a file format, the system comprising:
   attempting means for attempting to execute the file with a first computer application within the plurality of computer applications,
   selecting means, responsive to the first computer application being unable to recognize the file format, for selecting a second computer application within the plurality of computer applications to execute the file wherein the selecting means comprise:
      associating means for associating an error code with the first computer application;
      associating means for associating an index code with the error code; and
      selecting means for selecting the second computer application within the plurality of computer applications based on the index code; and
   executing means for executing the file using the selected second computer application.

10. The system of claim 9, wherein the secondary computer application is an alternate version of the first computer application.

11. The system of claim 9, wherein the error code is a predetermined value.

12. The system of claim 9, wherein selecting a second computer application from the plurality of computer applications to execute the file, further includes:
   displaying means for displaying a selectable presentation of at least one of the computer applications in the plurality of computer applications;
   receiving means for receiving an indication of a selection, from the data processing system, of at least one of the computer applications in the plurality of computer applications; and
   executing means for executing the file based on the selection.

13. The system of claim 12, wherein the selection is made from a remote terminal.

14. The system of claim 12, wherein the selection is made from a client.

15. A computer program on a computer usable medium having computer readable program code, having a plurality of computer applications, for executing a file with a file format, comprising:
   instructions for attempting to execute the file with a first computer application within the plurality of computer applications,
   instructions, responsive to the first computer application being unable to recognize the file format of the file, for selecting a second computer application within the plurality of computer applications to execute the file wherein the instructions for selecting comprise:
instructions for associating an error code with the first computer application;
instructions for associating an index code with the error code; and
instructions for selecting the second computer application within the plurality of computer applications based on the index code; and
instructions for executing the file using the selected second computer application.

16. The computer program product of claim 15, wherein the secondary computer application is an alternate version of the first computer application.

17. The computer program product of claim 15, wherein the error code is a predetermined value.

18. The computer program product of claim 15, wherein selecting a second computer application from the plurality of computer applications to execute the file, further includes:
instructions for displaying a selectable presentation of at least one of the computer applications in the plurality of computer applications;
instructions for receiving an indication of a selection, from the data processing system, of at least one of the computer applications in the plurality of computer applications; and
instructions for executing the file based on the selection.

19. The computer program product of claim 18, wherein the selection is made from a remote terminal.

20. The computer program product of claim 18, wherein the selection is made from a client.

* * * * *